Patented Apr. 15, 1952

2,593,259

UNITED STATES PATENT OFFICE 2,593,259

ACID CLEANER AND DETERGENT

George E. Brissey, Chicago, and Harland H. Young, Western Springs, Ill., assignors to Swift & Company, Chicago, Ill., a corporation of Illinois No Drawing. Application November 13, 1948, Serial No. 59,968

5 Claims. (Cl. 252—136)

The present invention relates to a composition for cleaning dairy and creamery equipment, and more particularly with an acidic reacting composition which is capable of removing milkstone deposits protected by a film of coagulated milk protein.

In cleaning equipment employed in the dairy industry it was the general practice at one time to use detergents of an alkaline nature, such as ordinary soaps and/or alkaline salts or caustic alkalies. More recently it has been discovered that mixtures of an acid nature are desirable adjuncts as cleaners for dairy equipment.

In employing a suitable acid-cleaning composition for dairy equipment an important consideration is the selection of an acid cleanser which exhibits the least corrosive effect on the metal composing the dairy and creamery equipment to be cleaned. While the conventional acid cleaners comprising organic acids and synthetic detergents as the active ingredients are fairly satisfactory in the removal of milkstone and other calcareous deposits from the surface of dairy and creamery equipment without causing prohibitive corrosion, these conventional cleaners have not been effective in removing calcareous deposits protected by a film of coagulated milk protein. It is generally understood that the milk protein is denatured by heat or enzymic action which causes a clotting together or a curdling of the protein. Accumulations of milkstone are thus often covered with a quantity of coagulated milk protein which stubbornly adhere to the surface of dairy equipment, thereby making the milkstone difficult to remove. This condition prevails especially after a temporary shutdown due, for example, to equipment failure so that the milk product is allowed to stagnate in plate heaters, filters, pipe lines, etc., at elevated processing temperatures.

Thus, an important object of this invention is to provide an acid cleaner or detergent having the power to more efficiently remove films of coagulated protein from the surface of dairy equipment.

Another object of the invention is to provide an acid cleaner capable of removing stubbornly adhering deposits from high-temperature milk and cream processing equipment.

A further object of the invention is to provide an acid cleaner and detergent capable of removing accumulations containing coagulated milk protein while causing a minimum corrosion of the dairy equipment.

Other objects and advantages of the invention will be apparent from a description of the invention given below.

We have found that we may overcome the deficiency of prior dairy equipment cleaners or detergents by using an acid-reacting mixture having a pH which is maintained below a critical pH value of 1.8. Thus, we have found that the surface-adhering accumulations comprising milkstone, protected by a film of coagulated milk protein, may be effectively dissolved with an acid cleaner only if the pH of the cleaning solution is reduced to a pH of 1.8 or lower. We have also found that we may prepare a composition comprising ingredients proportioned in such manner as to yield upon solution the desired pH of 1.8 or lower, and yet by virtue of the nature of the ingredients and the proportions thereof in the solution, the corrosive effects on the metal composing the dairy equipment is reduced to a minimum.

Broadly, the invention contemplates a cleaning composition comprising in combination: an organic acid stronger than acetic acid; phosphoric acid, an acid salt of the alkali metal type, such as sodium acid sulfate; and, optionally, a wetting agent and a corrosion inhibitor; the foregoing ingredients being proportioned in such manner as to yield on solution a pH not in excess of 1.8. For best results the solution comprising the aforementioned ingredients is used at an elevated temperature between about 135° F. to 165° F., with somewhat higher temperatures being equally satisfactory but unnecessary.

The use of the acid salt, in combination with the organic acid, makes possible the preparation of a cleaning composition yielding the desired low pH and having a reserve of hydrogen ions which maintains the solution effective over a prolonged period. The use of phosphoric acid serves to inhibit corrosion of the metal by the acid salt. For further protection an organic corrosion inhibitor may be employed if desired. Thus, through the use of the acid salt it is possible to achieve a low pH and yet avoid any undue corrosive effects. A low pH ordinarily is achieved through the use of a mineral acid such as sulfuric acid, but the use of a mineral acid other than phosphoric acid would produce in solution corrosive effects which would be difficult to prevent, and for this reason the use of a mineral acid other than phosphoric acid is prohibited. Although the ammonium acid sulfate or the acid sulfate of any alkali metal may be employed, sodium acid sulfate is to be preferred because of its ready availability and consequent cheapness.

In accordance with the principles of this invention, any organic acid whose strength is greater than acetic but which is weaker than mineral acid may be satisfactorily employed. As examples of suitable acids may be mentioned hydroxyacetic, citric, lactic, tartaric, formic, chloroacetic, dichloroacetic, a-chlorobutyric, bromacetic, a-bromopropionic, a-chloropropionic, etc.

Examples of suitable wetting agents that may be employed as ingredients of our acid composition may be mentioned: dodecyl benzene sodium sulfonate; and other alkyl aryl sulfonates, such as monobutyl phenol sodium monosulfonate. Other examples are the aliphatic alcohol sulfates and the sulfonated hydrocarbons. In general, any wetting agent that is compatible with the acid-reacting ingredients of the composition and is not inactivated thereby is useable.

In conjunction with the use of phosphoric acid as an anti-corrosion agent, we may advantageously employ an organic inhibitor. Since the use of an organic inhibitor is optional, and the invention does not reside therein, obviously any suitable organic inhibitor may be advantageously employed.

In preparing cleaning solutions in accordance with the principles of our invention, we have found that the concentration, or strength, of the solution is preferably varied, depending on the type of equipment which is desired to be treated, and the method of cleaning which is deemed to be most suitable for the particular equipment at hand.

By varying the concentration of the solution, not however to the extent that the pH thereof would be higher than about 1.8, it is possible to insure against corroding the different types of dairy equipment. For example, glass-lined equipment, stainless steel, and tinned copper metallic surfaces may be advantageously cleaned with a solution possessing a strength appropriate to the material being treated, and in the latter instances the solution may possess a pH in the range of from 1 to 1.8. Thus, for example, a solution to clean metal composed of tinned copper will preferably have a pH around 1.8, while a solution for stainless steel equipment may have a pH of around 1.0 or less.

In preparing cleaning solutions of different concentrations, we have found it advantageous to first prepare the concentrate which may then be diluted to form a solution of the desired strength. As a general illustrative example of a concentrate of the acid-cleaning composition prepared in accordance with the principles of this invention, the percentages by weight of the ingredients making up the solution to yield in solution a pH of between about 1.0 to 1.8 are given below:

| | Percent |
|---|---|
| Hydroxyacetic acid | 10 to 30 |
| Wetting agent | 2 to 10 |
| Sodium bisulfate (nitre of salt cake) | 3 to 10 |
| Water | remainder |

As a more specific example of a preferred concentrate with which various solutions may be prepared, percentages by weight of the various ingredients thereof are given below:

| | Percent |
|---|---|
| Hydroxyacetic acid (70%) | 20 |
| Polyether alcohol | 3 |
| Phosphoric acid (85%) | 6 |
| Sodium bisulfate | 8 |
| Water | 63 |

The concentrate prepared as illustrated above has a pH of about 0.55 and may be diluted with water to give a solution of the desired strength, a concentration of about 7 per cent giving a pH of around 1.78. For non-corrosive metal, such as stainless steel, or glass lined equipment and the like, the concentrate as such may be advantageously employed, especially where the equipment is large and the use of a large volume of solution would prove cumbersome. In this case the concentrate may be applied to the equipment by a brush, thus making necessary only a small volume of cleaning composition. For solutions which are to be used by circulating the cleaning material through the equipment, such as plate heaters, pipe lines, and the like, we have found that water solutions of the concentrate prepared in strengths within the range of about 7 per cent to 15 per cent are particularly satisfactory. Solutions within this range exhibit a pH of between about 1.5 to 1.8. A preferred solution is 7.0 per cent solution of the concentrate which may be prepared by mixing 70 pounds of the concentrate with 930 pounds of water.

Solutions of the herein-described cleaning composition may be used according to the conventional methods of cleaning diary equipment. Thus, our cleaning solution may be circulated through equipment desired to be cleaned, such as pipe lines and plate heaters. The cleaning solution may also be used, for example, in the mechanical washing of cans, where either the rotary or straightaway type of washers are employed. Other methods of cleaning, such as soaking or painting on the surface by means of a fiber brush, are equally adaptable to the use of our cleaning composition. Our cleaner may be employed as a complete one-step cleaner in place of the two-step acid and alkaline detergents heretofore used.

Obviously, many modifications and variations of the invention as hereinbefore set forth may be made without departing from the spirit and scope thereof, and therefore only such limitations should be imposed as are indicated in the appended claims.

We claim:

1. A composition for dissolving a film of coagulated milk protein comprising the following ingredients: phosphoric acid, an alkali metal acid sulfate, and an organic acid stronger than acetic and weaker than a mineral acid, said ingredients being proportioned with water to form a solution having a pH below 1.8 for dissolving a film of coagulated milk protein.

2. A composition as described in claim 1 wherein the pH of the solution is between about 1.0 and 1.8, said composition being adaptable for the cleaning of corrodible metal.

3. A cleaning composition concentrate for dissolving a film of coagulated milk protein, comprising 10 to 30 per cent hydroxyacetic acid, 3 to 10 per cent phosphoric acid, 3 to 10 per cent sodium bisulfate, 2 to 10 per cent of a wetting agent compatible with the foregoing acid-reacting ingredients, and water, said concentrate having a pH below 1.8 when diluted with water to form at least a 7 per cent solution therein.

4. A cleaning composition concentrate for dissolving a film of coagulated milk protein, comprising 10 to 30 per cent of an organic acid selected from the group consisting of hydroxyacetic, citric, lactic, tartaric, formic, chloroacetic, dichloroacetic, a-chlorobutyric, bromacetic, a-bromopropionic, and a-chloropropionic, 3 to 10 per cent of a phosphoric acid, 3 to 10 per cent of an alkali metal acid sulfate, 2 to 10 per cent of a wetting agent compatible with the foregoing acid-reacting ingredients, and water, said concentrate having a pH below 1.8 when diluted with water to form at least a 7 per cent solution therein.

5. A cleaning composition concentrate for dissolving a film of coagulated milk protein, comprising 10 to 30 per cent organic acid stronger than acetic and weaker than a mineral acid, 3 to 10 per cent of a phosphoric acid, 3 to 10 per cent of an alkali metal acid sulfate, 2 to 10 per cent of a wetting agent compatible with the foregoing acid-reacting ingredients, and water, said concentrate having a pH below 1.8 when diluted with water to form at least a 7 per cent solution therein.

GEORGE E. BRISSEY.
HARLAND H. YOUNG.

REFERENCES CITED

The following references are of record in the file of this patent:

UNITED STATES PATENTS

| Number | Name | Date |
| --- | --- | --- |
| 1,525,606 | Gravell | Feb. 10, 1925 |
| 2,338,688 | Parker et al. | Jan. 4, 1944 |
| 2,338,639 | Parker et al. | Jan. 4, 1944 |

OTHER REFERENCES

"Surface Active Agents," Ind. & Eng. Chem. vol. 33, No. 1, January 1941. (Copy in Sci. Lib.)